United States Patent
Rakshit et al.

(10) Patent No.: US 11,631,046 B2
(45) Date of Patent: Apr. 18, 2023

(54) DELIVERY PRODUCT ASSEMBLY IN COLLABORATION WITH INTELLIGENT AUTONOMOUS VEHICLE TRANSPORTATION SYSTEM

(71) Applicant: International Business Machines Corporation, Armonk, NY (US)

(72) Inventors: Sarbajit K. Rakshit, Kolkata (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 16/923,746

(22) Filed: Jul. 8, 2020

(65) Prior Publication Data
US 2022/0012688 A1     Jan. 13, 2022

(51) Int. Cl.
*G06Q 10/08*     (2023.01)
*G06Q 10/04*     (2023.01)
(Continued)

(52) U.S. Cl.
CPC ..... *G06Q 10/08355* (2013.01); *G05D 1/0088* (2013.01); *G05D 1/0221* (2013.01);
(Continued)

(58) Field of Classification Search
CPC .......... G06Q 10/08355; G06Q 10/047; G06Q 10/0875; G05D 1/0088; G05D 1/0221;
(Continued)

(56) References Cited

U.S. PATENT DOCUMENTS 8,010,220 B1 *  8/2011  Ames ............... G06Q 10/06
                                                    414/467
9,561,852 B1    2/2017  Beaman
                        (Continued)

OTHER PUBLICATIONS

Yunfang Peng, Tian Zeng, Yajuan Han, Beixin Xia, "Scheduling Just-in-Time Transport Vehicles to Feed Parts for Mixed Model Assembly Lines", Discrete Dynamics in Nature and Society, vol. 2020, Article ID 2939272, 13 pages, 2020. https://doi.org/10.1155/2020/2939272 (Year: 2019).*

*Primary Examiner* — Rupangini Singh
*Assistant Examiner* — Manal A. Alsamiri
(74) *Attorney, Agent, or Firm* — David B. Woycechowsky

(57) ABSTRACT

Aspects of the present invention disclose a method for coordinating assembly of a final product in transit via an autonomous vehicle. The method includes one or more processors identifying a delivery request from a user for a product. The method further includes identifying suppliers of component parts of the product. The method further includes determining common delivery routes of the component parts of the product, wherein the common delivery routes includes respective routes from locations of the one or more suppliers to a delivery destination of the delivery request. The method further includes determining a delivery path to the delivery destination of the product based at least in part on the common delivery routes. The method further includes generating a final delivery plan corresponding to the product for one or more autonomous vehicles based at least in part on the delivery path and the suppliers of the component parts.

14 Claims, 4 Drawing Sheets

(51) Int. Cl.
*G05D 1/02* (2020.01)
*G06Q 10/0835* (2023.01)
*G06Q 10/0875* (2023.01)
*G05D 1/00* (2006.01)
*G06Q 10/047* (2023.01)

(52) U.S. Cl.
CPC ......... *G05D 1/0291* (2013.01); *G06Q 10/047* (2013.01); *G06Q 10/0875* (2013.01)

(58) Field of Classification Search
CPC .. G05D 1/0291; G05D 1/0217; G05D 1/0297; G05D 2201/0213; G06N 20/00; G01C 21/343; G01C 21/3438; G06F 40/20; G06F 40/205
See application file for complete search history.

(56) References Cited

U.S. PATENT DOCUMENTS

| | | |
|---|---|---|
| 10,139,838 B2 | 11/2018 | Lection |
| 10,372,127 B2 | 8/2019 | Chefalas |
| 2017/0083862 A1* | 3/2017 | Loubriel ............ G06Q 10/0835 |
| 2018/0276595 A1* | 9/2018 | Gariepy ........... G06Q 10/06313 |
| 2019/0049262 A1* | 2/2019 | Grimm .............. G01C 21/3484 |
| 2019/0053178 A1* | 2/2019 | Merwaday ............ H04W 4/023 |
| 2019/0187696 A1 | 6/2019 | Greenberger |
| 2020/0293564 A1* | 9/2020 | Reh ....................... G06F 16/906 |

\* cited by examiner

DELIVERY PRODUCT ASSEMBLY IN COLLABORATION WITH INTELLIGENT AUTONOMOUS VEHICLE TRANSPORTATION SYSTEM

BACKGROUND OF THE INVENTION

The present invention relates generally to the field of intelligent transportation systems, and more particularly to assembling of a delivery product in transit to a delivery deposit location.

A delivery device is an autonomous vehicle used to transport packages, food or other goods. Delivery devices are unmanned electro-mechanical devices that can deliver lightweight packages. Delivery devices are operated remotely, with operators potentially overseeing multiple delivery devices at once.

Context awareness originated as a term from ubiquitous computing or pervasive computing which sought to deal with linking changes in an environment with computer systems, which are otherwise static. Context awareness refers to the idea that computers can both sense and react based on their environment and devices may have information about the circumstances under which devices are able to operate and based on rules, or an intelligent stimulus, react accordingly.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for coordinating assembly of a final product in transit via an autonomous vehicle. The method includes one or more processors identifying a delivery request from a user for a product. The method further includes one or more processors identifying suppliers of component parts of the product. The method further includes one or more processors determining common delivery routes of the component parts of the product, wherein the common delivery routes includes respective routes from locations of the one or more suppliers to a delivery destination of the delivery request. The method further includes one or more processors determining a delivery path to the delivery destination of the product based at least in part on the common delivery routes. The method further includes one or more processors generating a final delivery plan corresponding to the product for one or more autonomous vehicles based at least in part on the delivery path and the suppliers of the component parts.

DETAILED DESCRIPTION

Embodiments of the present invention allow for in transit assembly of a delivery product while managing and controlling autonomous vehicle paths during delivery of the delivery product. Embodiments of the present invention perform context aware communications between autonomous vehicles to couple with one another while in route based on an assembly sequence of a delivery product, relative locations of the autonomous vehicles, and/or possibility of parallel or subassemblies. Embodiments of the present invention determines an assembly sequence of a delivery product and optimizes time to build the delivery product with respect to a travel time of a delivery path. Additional embodiments of the present invention determines a path to delivery destinations of delivery products to allow for assembly of the delivery products while coupled autonomous vehicles are in route based at least in part on identified delivery destinations of the delivery products, component parts of the delivery products, available required assembly time, and/or optimized cost.

Some embodiments of the present invention recognize that challenges exist in supply chain networks between a company and suppliers to produce and distribute a specific product to a final buyer. For example, a product is assembled on an assembly line and a final product is created. Additionally, assembling the final product requires sufficient time for transporting various parts of the final product from various locations to the assembly line and assembly. Furthermore, after the final product is assembled, additional time is required to deliver the final product to a customer location. Thus, the present invention recognizes a window within a supply chain to reduce assembly and intermediate transportation time of various parts of the final product. Various embodiments of the present invention provide a multi-autonomous vehicle delivery ecosystem that couples a plurality of autonomous vehicles carrying parts of a final product of various location to assemble the final product, based on the sequence of assembling of different machine parts to create final product, while travelling along a defined delivery route.

Implementation of embodiments of the invention may take a variety of forms, and exemplary implementation details are discussed subsequently with reference to the Figures.

Figure 1:
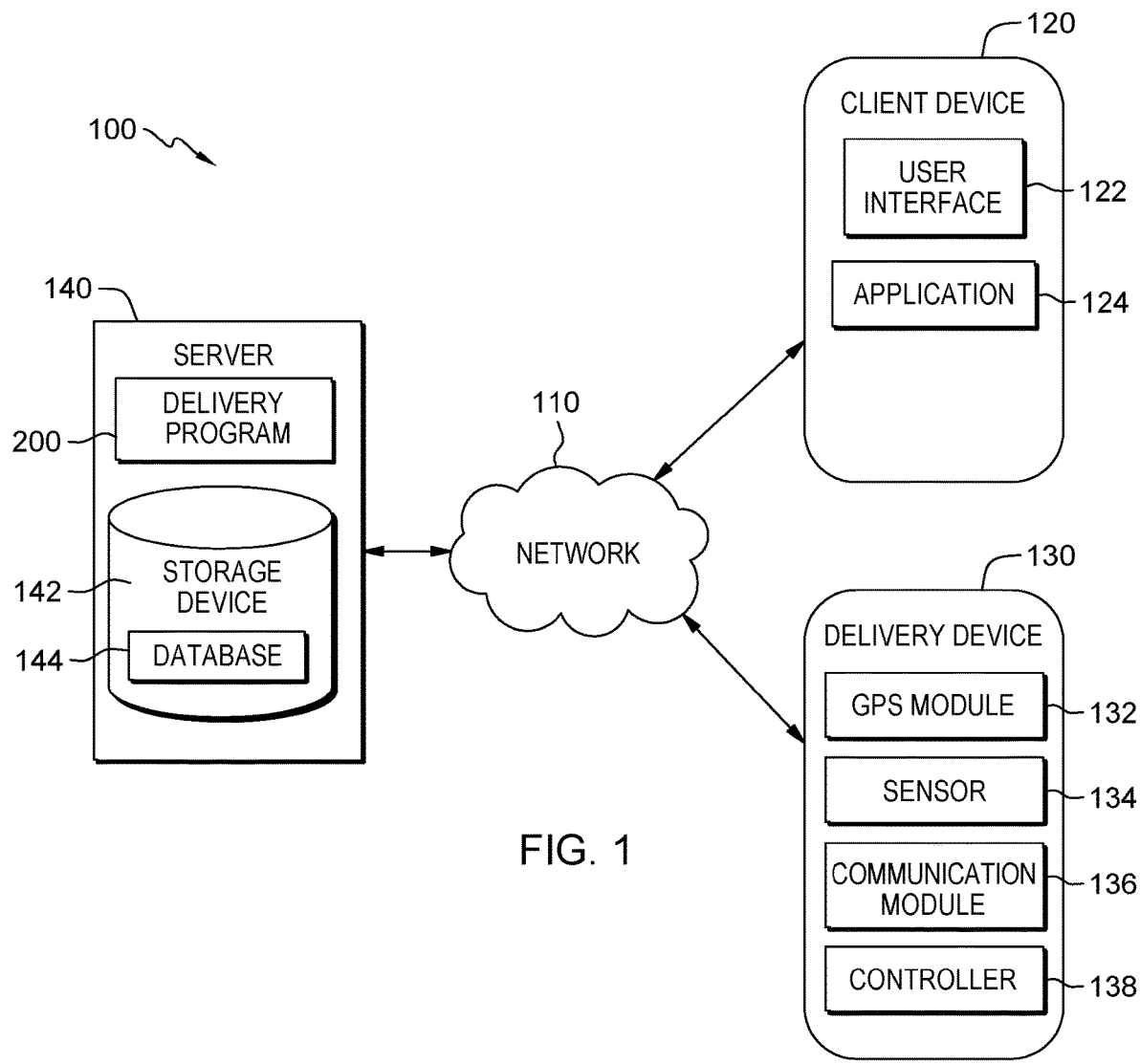
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Delivery program 200 enables the authorized and secure processing of personal data. Delivery program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Delivery program 200 provides information regarding personal data and the nature (e.g., type, scope, purpose, duration, etc.) of the processing. Delivery program 200 provides the user with copies of stored personal data. Delivery program 200 allows the correction or completion of incorrect or incomplete personal data. Delivery program 200 allows the immediate deletion of personal data.

Distributed data processing environment 100 includes server 140, client device 120 and delivery device 130, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, client device 120, and delivery device 120, and other computing devices (not shown) within distributed data processing environment 100.

In various embodiments of the present invention, client device 120 may be a workstation, personal computer, digital video recorder (DVR), media player, personal digital assistant, mobile phone, digital camera, smart warehouse, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 4, in accordance with embodiments of the present invention.

Client device 120 includes a processor, user interface 122, and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of delivery program 200. For example, delivery program 200 utilizes application 124 to transmit a bill of materials (BOM) and/or information (e.g., availability of final product components) corresponding to a delivery request.

In various embodiments of the present invention, delivery device 130 may be an unmanned electro-mechanical device that includes a ground-based controller, either under remote control by a human operator or autonomously by onboard computers that is capable of executing computer readable program instructions, in accordance with embodiments of the present invention. In general, delivery device 130 is representative of any electronic device or combination of electronic devices capable of executing computer readable program instructions. Delivery device 130 may include components as depicted and described in further detail with respect to FIG. 4, in accordance with embodiments of the present invention.

Delivery device 130 may include one or more speakers, a camera, a processor, global positioning system (GPS) module 132, sensor 134, communications module 136, and controller 138. GPS module 132 is a global navigation system that provides geolocation information of an object. In one embodiment, GPS module 132 provides geolocation information of delivery device 130 to delivery program 200. For example, a geo-spatial metrics module (e.g., GPS module 132) provides real-time geolocation data for an autonomous vehicle (e.g., delivery device 130) to delivery program 200. In another example, a geo-spatial metrics module (e.g., GPS module 132) provides real-time geolocation data for a first autonomous vehicle (e.g., delivery device 130) to a second autonomous vehicle (not shown). In another embodiment, GPS module 132 may be a global positioning system (GPS) or satellite receivers to navigate delivery device 130 to a predetermined location. For example, GPS module 132 can be utilized to transmit delivery deposit locations and routes to delivery device 130.

Sensor 134 is a device, module, machine, or subsystem that detects events or changes in an environment of the device and send the information to other electronics. In one embodiment, sensor 134 represents a variety of sensors of delivery device 130 that collects and provides various kinds of data. In this embodiment, sensor 134 provides information about delivery device 130 to server 140. For example, sensor 134 can capture information about delivery device 130 and/or an operating environment of delivery device 130. In this example, sensor 134 can capture proximity, image, speed, acceleration, wind conditions, etc., of an autonomous vehicle (e.g., delivery device 130) and transmit the information of delivery device 130 to database 144. Alternatively, the information of delivery device 130 may be transmitted to an autonomous vehicle (not shown) in a context aware communication of communications module 136.

Communications module 136 may be a radio transmitter/receiver, application, or a computer utilized to transmit communications of delivery device 130. In one embodiment, delivery device 130 transports a final product corresponding to a delivery request of a user to a predetermined location of the delivery request. For example, communications module 136 transmits a context aware communication to one or more autonomous vehicles that includes information about an environment of delivery device 130. In this example, context aware communication includes a sequence of assembling, relative location of delivery device 130, and/or possibilities of parallel or sub-assemblies.

In another embodiment, communications module 136 transmits data of delivery device 130. For example, communications module 136 includes radio frequency identification (RFID) circuitry, which includes an RFID tag that comprises a radio transponder, a radio receiver, and transmitter. In this example, the RFID tag is utilized identify delivery device 130. Additionally, communications module 136 utilizes the RFID tag to authenticate an autonomous vehicle prior to transmitting a context aware communication. In another example, communications module 136 may transmit context aware communications for coupling of two or more autonomous vehicles (e.g., delivery device 130) through near-field communications (e.g., network 110).

Controller 138 may be a wireless controller for delivery device 130, as delivery device 130 is considered to be autonomous based on onboard computers that are capable of executing computer readable program instructions, in accordance with embodiments of the present invention. In one embodiment, controller 138 provides delivery device 130 instructions to perform maneuvers corresponding to a task of delivery program 200. For example, delivery program 200 determines that delivery device 130 should couple (e.g., task) with an autonomous vehicle (not shown) and controller 138 transmits signals to delivery device 130 to taxi (e.g., maneuver) at a predefined geolocation in place while the autonomous vehicle couples to delivery device 130.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120, delivery device 130, and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and delivery program 200. Storage device 142 can be implemented with any type of storage device, for example, persistent storage 405, which is capable of storing data that may be accessed and utilized by client device 120, delivery device 130, and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140. For example, database 144 can include geolocations, delivery request, bill of materials, weather conditions, sensor data, etc. In one embodiment, data processing environment 100 can include additional servers (not shown) that host additional information that accessible via network 110.

As previously mentioned, the methods and systems of the illustrated embodiments provide novel approaches for managing autonomous vehicles, such as during the delivering of products to customers. Generally, delivery program 200 utilizes artificial intelligence and machine learning techniques to coordinate assembly of a final product, which includes two or more components from various locations, in transit via an autonomous vehicle. In one embodiment, delivery program 200 utilizes delivery device 130 to assemble an item of a delivery request. For example, delivery program 200 manages one or more autonomous vehicles, each carrying different component parts of various final products. In this example, delivery program 200 identifies a sequence of assembly of the various final products, relative location of autonomous vehicles, and/or parallel or sub-assemblies of the various final products to generate context aware communications for the autonomous vehicles. Additionally, delivery program 200 utilizes context aware communications to couple autonomous vehicles while in transit to a delivery destination to assemble a final product utilizing the different components parts of the autonomous vehicles based on an assembly sequence of the final product.

In another embodiment, delivery program 200 determines an assembly sequence of a final product of a delivery request of a user. In various embodiments of the present invention, due to the standard optimization decision process of sub-assemblies and interfaces between the sub-assemblies having common components parts, delivery program 200 cannot use typical independent mathematical equations or linear programming. Thus, delivery program 200 can utilize deep learning models to determine the assembly sequences of a final product. For example, delivery program 200 utilizes a machine learning algorithm to determine an assembly sequence of an item of a delivery request based on autonomous vehicle travel time and assembly time of the item. In this example, delivery program 200 uses deep learning models to determine parallel and linear assembly sequences of one or more components of the item to assemble a final product (e.g., the item of the delivery request) in an assembly chamber of an autonomous vehicle (e.g., delivery device 130) while in transit to a delivery destination of a user.

In another embodiment, delivery program 200 utilizes an assembly sequence of an item to manage one or more instances of delivery device 130. For example, delivery program 200 utilizes an assembly sequence of a bill of material of a delivery request of a user for a final product to identify an autonomous vehicle (e.g., delivery device 130), which is nearest in proximity to an assembling autonomous vehicle (e.g., delivery device 130) that includes a succeeding component part of the assembly sequence of the final product. In this example, delivery program 200 transmits a communication to the autonomous vehicle that includes instructions to transfer the succeeding component part to the assembling autonomous vehicle where assembly of the final product is in progress.

In an alternative example, an autonomous vehicle (e.g., delivery device 130) includes storage chambers for various component parts of a final product and/or a three-dimensional (3D) printing module utilized to print spare component parts. In an alternative example, delivery program 200 identifies two or more instances of delivery device 130 that each include a component part of items of the same type. Also, delivery program 200 utilizes a machine learning algorithm to determine a common route of the two or more instances of delivery device 130 to along a route to delivery destinations of the items. In this example, the two or more instances of delivery device 130 transmit and receive context aware communications to couple and an assemble the items in route to the delivery destinations.

In another embodiment, delivery program 200 determines common route to a delivery destination for items of two or more instances of delivery device 130. For example, delivery program 200 utilities a delivery destination of different final products and a location of a warehouse (e.g., client device 120) of individual component parts to determine a delivery route of the final products. Also, delivery program 200 can consider the availability of required assembling time of the final products to determine a common path within routes of the final products to assemble the final product in coupled autonomous vehicles in route to the delivery destinations. In another embodiment, delivery program 200 assigns an appropriate quantity of individual component parts to one or more instances of delivery device 130 to assemble one or more final products while traveling toward a delivery destination without returning to client device 120.

Figure 2:
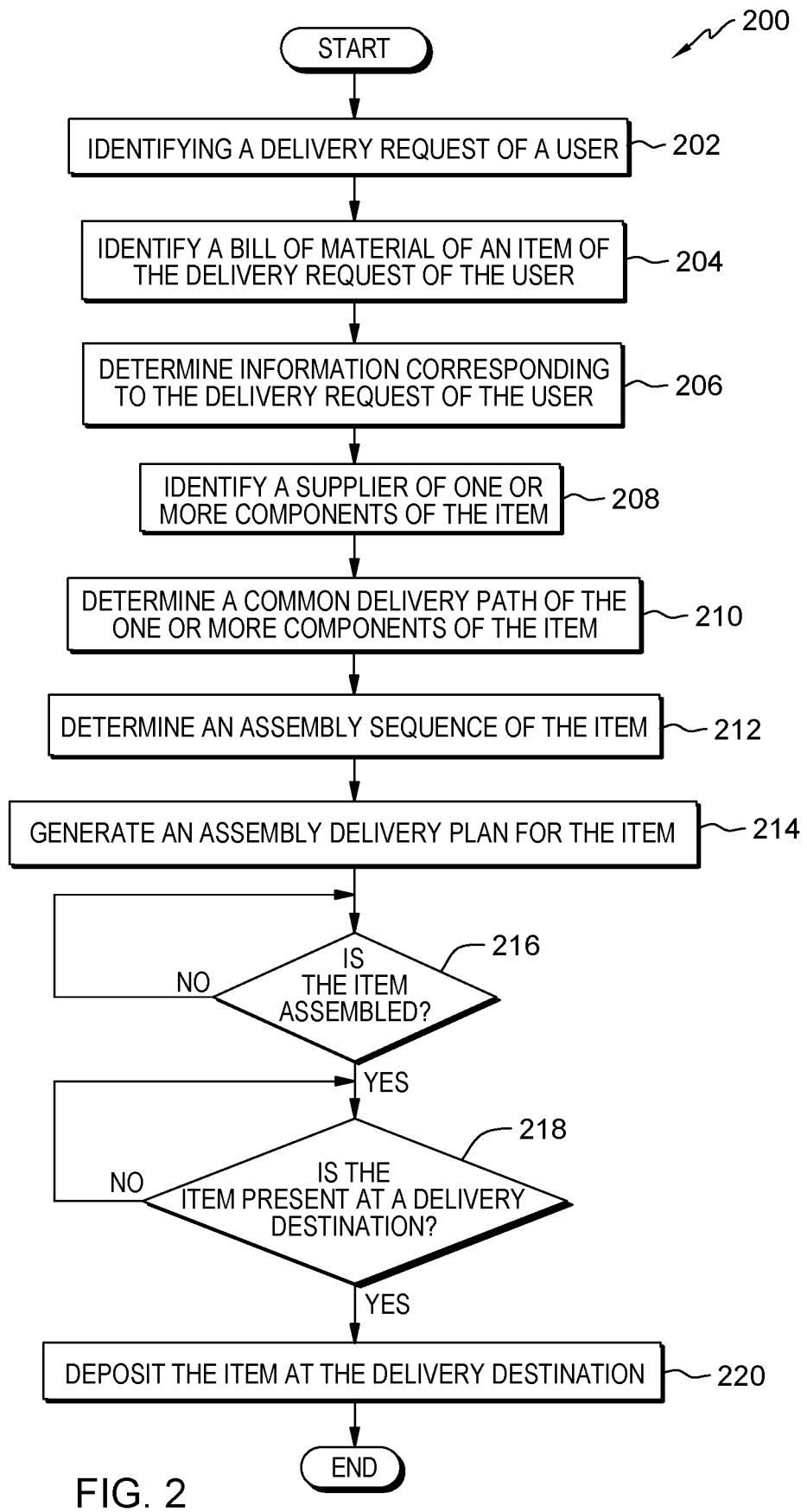
FIG. 2 is a flowchart depicting operational steps of a program, within the data processing environment of FIG. 1, for coordinating assembly of a final product in transit via an autonomous vehicle, in accordance with embodiments of the present invention.

FIG. 2 is a flowchart depicting operational steps of delivery program 200, a program that coordinates assembly of a final product in transit via an autonomous vehicle, in accordance with embodiments of the present invention. In one embodiment, delivery program 200 initiates in response to a user completing a delivery request through network 110. For example, delivery program 200 initiates in response to a user requesting an item for delivery from server 140 via a WLAN (e.g., network 110). In another embodiment, delivery program 200 is a background application that continuously monitors client device 120. For example, delivery program 200 is a client-side application (e.g., application 124) that initiates upon booting of a laptop (e.g., client device 120) of supplier and monitors delivery requests received from a plurality of users.

In step 202, delivery program 200 identifies a delivery request of a user. In one embodiment, delivery program 200 utilizes application 124 to detect a delivery request of a user. For example, delivery program 200 monitors an order receiving system (e.g., client-side application, application 124) of a computing device (e.g., client device 120). In this example, delivery program 200 detects receipt of a communication of one or more users and uses natural language processing (NLP) techniques (e.g., parsing, natural language understanding, topic segmentation, etc.) to determine whether the communication includes a delivery request for a final product (e.g., robotic toy, Wall Clock, Toy vehicles etc.). Additionally, delivery program 200 utilizes NLP techniques to identify the final product of the delivery request. In another embodiment, delivery program 200 retrieves a delivery request of a user from database 144 of server 140. For example, delivery program 200 identifies one or more delivery request of a user stored in a database (e.g., database 144) of a remote server (e.g., server 140) and uses natural language processing (NLP) techniques (e.g., parsing, natural language understanding, topic segmentation, etc.) to determine a final product (e.g., robotic toy, Wall Clock, Toy vehicles etc.) corresponding to the delivery request.

In step 204, delivery program 200 identifies a bill of material of an item of the delivery request of the user. In one embodiment, delivery program 200 identifies a bill of material of storage device 142 corresponding to a delivery request of a user. For example, delivery program 200 uses NLP techniques (e.g., parsing, natural language understanding, topic segmentation, etc.) to identify a bill of material of a central repository of storage device (e.g., storage device 142) of a server. Additionally, a plurality of final products is stored in the central repository with a corresponding bill of material, which are each assigned a unique identifier based on a respective final product of the plurality of final products. Furthermore, the corresponding bill of material includes a list of component parts and assembly sequence of the respective final product. In this example, delivery program 200 identifies a unique identifier of the bill of material of a final product of a delivery request of the user and retrieves the bill of material from the central repository using the unique identifier.

In step 206, delivery program 200 determines information corresponding to the delivery request of the user. In various embodiments of the present invention, information can include customer location, delivery date, component part locations, and/or autonomous vehicle identification. In one embodiment, delivery program 200 derives information from a delivery request of storage device 142. For example, delivery program 200 extracts an address and delivery date of a final product from a delivery request of a user. Additionally, delivery program 200 parses a bill of material of the delivery request to determine the number of component parts and corresponding supplier locations of the final product. In this example, delivery program 200 determines the number of autonomous vehicles (e.g., delivery device 130) to transport each of the individual component parts of the final product for to the address of the user. Furthermore, delivery program 200 identifies the autonomous vehicles based on one or more components the autonomous vehicles transport.

Figure 3:
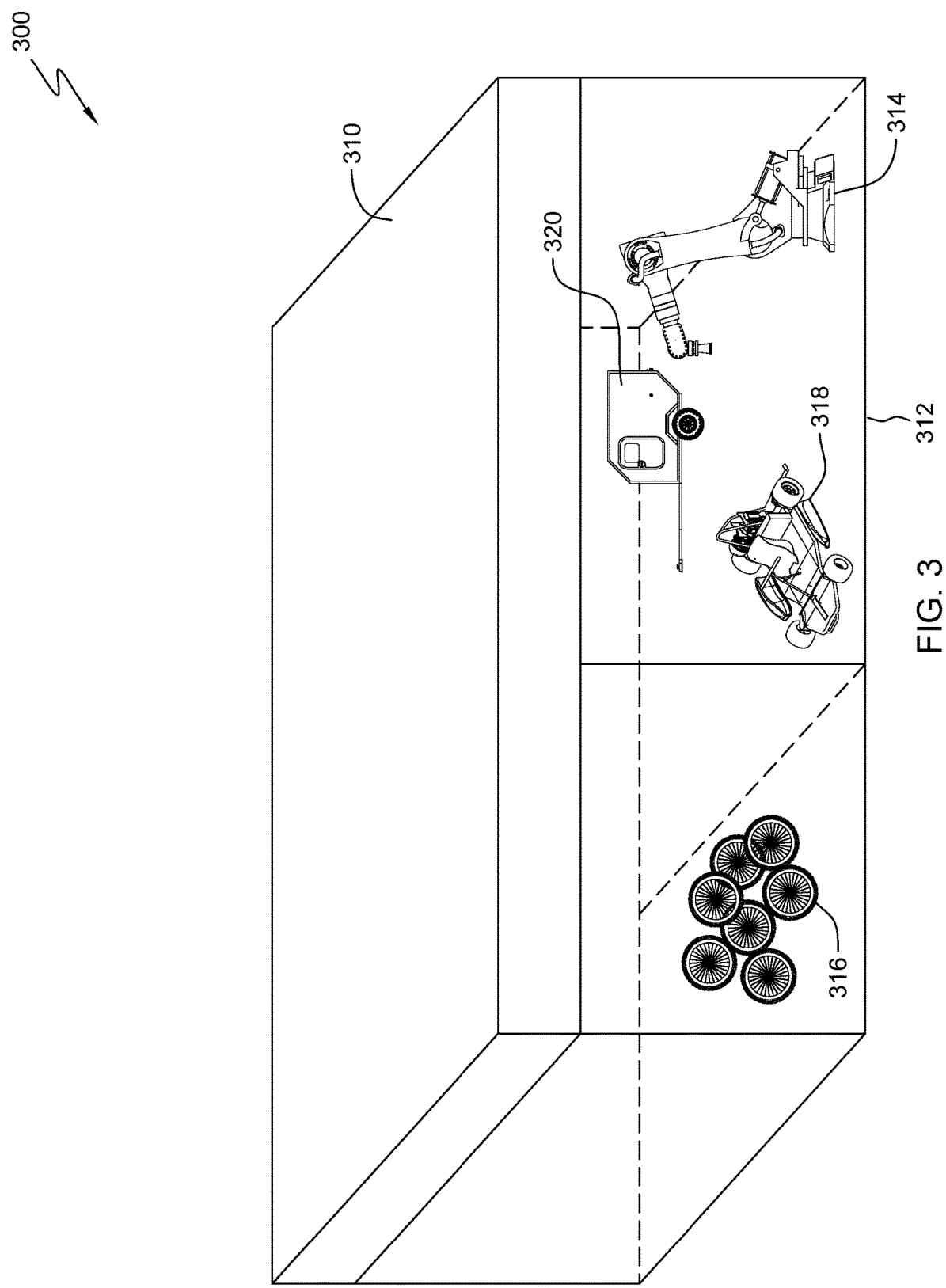
FIG. 3 depicts an example illustration of an instance of an autonomous vehicle that transports and assemble a final product, in accordance with embodiments of the present invention.

FIG. 3 depicts assembly environment 300, which is an example illustration of an instance of an autonomous vehicle that delivery program 200 manages to transport and assemble a final product, in accordance with example embodiments of the present invention. Assembly environment 300 includes vehicle 310, chamber 312, assembly arm 314, component part 316, unfinished product 318, and final product 320. Vehicle 310 is an autonomous vehicle for transporting and delivering a final product. Chamber 312 is a storage area below vehicle 310 that delivery program 200 utilizes to transport items, assemble items, store component parts of items, and/or 3D print spare component parts of items. Assembly arm 314 is a robotic arm used for several manufacturing applications, including welding, material handling and material removal. Component part 316 can represent individual components, which may be spring, gear wheel, battery, control circuit, pivotal join, body parts of any final product etc. Unfinished product 318 is an item corresponding to a delivery request of a user that has not finished an assembly sequence. Final product 320 is an item corresponding to a delivery request of a user that has completed an assembly sequence. In an example embodiment with respect to FIG. 3, delivery program 200 utilizes assembly arm 314 and component part 316 to construct final product 320.

In step 208, delivery program 200 identifies a supplier of one or more components of the item. In one embodiment, delivery program 200 determines a location of client device 120 that includes one or more components parts of an item of a delivery request. For example, delivery program 200 utilizes a bill of material of a final product of a delivery request to identify locations of suppliers of one or more component parts for assembling the final product. In this example, delivery program 200 extracts supplier locations (e.g., address, geolocation, coordinates, etc.) of one or more suppliers of each component part of the final product from the bill of materials. In another example, delivery program 200 utilizes the bill of materials to identify a list of suppliers of component parts required for assembly of a final product. In this example, delivery program 200 utilizes a local network (e.g., network 110) to identify one or more computing devices (e.g., client device 120) of the list of suppliers and retrieve a geolocation of the one or more computing devices corresponding to the location of each supplier of a component part of the final product. In another example, delivery program 200 identifies each autonomous vehicle carrying different component parts of different final products to communicate (e.g., context aware communications) and couple with each other in transit as per an assembly sequence of each of the different final products.

In step 210, delivery program 200 determines a common delivery path of the one or more components of the item. In various embodiments of the present invention, delivery program 200 identifies delivery destinations of different final products and locations of corresponding individual components. Then, delivery program 200 can select a suitable delivery path to a delivery destination of a customer so that the final products can be assembled in transit based on the availability of required assembling time and optimized cost (e.g., composite distance travelled by one or more autonomous vehicles).

In one embodiment, delivery program 200 identifies one or more routes from locations of instances client device 120 to a delivery path of an item taken one or more instances of delivery device 130 to a delivery destination. For example, delivery program 200 identifies one or more routes from one or more suppliers (e.g., client device 120) of component parts of a final product to a delivery path of the final product to a delivery destination. Additionally, delivery program 200 selects a route of the one or more routes for one or more autonomous vehicles (e.g., delivery device 130), which are travelling toward the delivery path, to transport individual component parts of an assembly sequence of the final product to the delivery path for assembly.

In another example, delivery program 200 inputs geolocations of identified suppliers (e.g., client device 120) of component parts (as discussed in step 208) required for assembly of a final product and delivery destinations (e.g., address) of users in to a machine learning model (e.g., artificial neural network) trained to identify common paths of one or more geolocations to determine a delivery path of the final product. In this example, delivery program 200 identifies a common route of an identified supplier of a component part of the final product within a defined threshold distance of a delivery path to the delivery destination of a user. Additionally, delivery program 200 can utilize an assembly sequence of a bill of material of the final product to determine the common routes available so that autonomous vehicles (e.g., delivery device 130) transporting the final product can assemble the final product or perform subassemblies in transit to a delivery destination.

In another embodiment, delivery program 200 determines one or more assembly staging areas of a delivery route of one or more instances of delivery device 130. For example, delivery program 200 inputs data (e.g., route clearance, velocity, weather conditions, wind velocity, precipitation, etc.) corresponding to an operating environment of an autonomous vehicle from an onboard sensor (e.g., sensor 134) of into the machine learning model to identify suitable conditions of stable environments along a delivery path of a final product for taxi maneuvers. In this example, delivery program 200 determines whether a staging area (e.g., endpoint at a delivery path of a common route from a component supplier) for one or more autonomous vehicles to perform an assembly or sub-assembly is suitable based on conditions derived from the data along the delivery path.

Furthermore, delivery program 200 identifies delivery route optimizations (e.g., parallel assemblies, sub-assembly, corresponding common routes, etc.), which reduce delivery time and/or assembly time, that allow for performing assembly tasks of an assembly sequence for the final product in advance of a scheduled timeframe of the assembly sequence. For example, delivery program 200 may utilize a three-dimensional (3D) printing module to print a component part in advance of an assembly sequence to couple one or more autonomous vehicles for assembly while in transit and/or storing and assembled portions of component parts of different final products (i.e., optimizing a route by performing parallel assemblies that eliminate a need for identifying and traversing a common route).

In step 212, delivery program 200 determines an assembly sequence of the item. In various embodiments of the present invention, an assembly sequence describes how and in what order to assemble various component parts of an item of a delivery request to create the item. In one embodiment, delivery program 200 determines an assembly sequence of an item of a delivery request using data of database 144.

For example, delivery program 200 retrieves an assembly sequence of a final product of a delivery request from a database (e.g., database 144). In this example, delivery program 200 utilizes the bill of material corresponding to the delivery request to identify an assembly sequence of the final product of the delivery request. Additionally, delivery program 200 utilizes the bill of material corresponding to the delivery request to identify segments of the final product comprised of one or more component parts that may be assembled in concurrently with other segments of the final product, in accordance with the assembly sequence of the bill of material. Furthermore, delivery program 200 inputs sequence of assembly, relative position of autonomous vehicles (e.g., delivery device 130), possibilities of sub-assemblies into a machine learning model to generate context aware communication of the autonomous vehicles assembling the final product. The context aware communication includes instructions to manage coupling of two or more autonomous vehicles, transfer of bill of material information of a final product, and/or transfer component parts of the final product.

In another example, delivery program 200 utilizes Artificial Intelligence (AI) and deep learning models (e.g., AI platform) to determine possible sequences for parallel and linear assembly to create a final product while delivering the final product to the customer. In this example, delivery program 200 inputs dynamic factors such as wind speed, route clearance and stability, to utilize along with the physical component list of the bill of material into the AI platform to obtain a recommended sequence and optimizing the time taken to build the final product against the travel times.

In example embodiments, the AI platform is based on the dependency between 'k' and 'm' typically solved with forms of the cognitive computing and varying times 't' for the step of an assembly sequence. Also, the AI platform learns from different transactions (e.g., transfers of component parts, printing component parts, etc.), the possible ranges, and thus computing available route optimizations and assembly sequences:

$$S(p_1)=F\{(S(a_1),S(a_2) \ldots S(a_n)),t\} \quad (1)$$

where 'S' is a sequence of assembly, '$p_n$' is the final product of a function evaluated to the value 'n', '$a_n$' is a sub-assembly of a function evaluated to the value 'n', and 't' is the time for the completion of the step of the sequence of assembly; and $$S(a_1)=F\{A(c_k),P(d_m,t),t\} \quad (2)$$

where 'k' and 'm' are the component parts in the sub-assembly and 'm' belongs to 'k', where 'S' is a sequence of assembly, 'P' is in situ 3D printing on an autonomous vehicle of component part d, and 't' is the time for the completion of the step.

For example, delivery program 200 utilizes the AI platform to identify a next component for assembly for any final product being assembled, and accordingly communicating with a nearest autonomous vehicle that includes a required component part a step of the assembly sequence to transfer the required component part to a candidate autonomous vehicle where assembly is in progress.

In step 214, delivery program 200 generates an assembly delivery plan for the item. In one embodiment, delivery program 200 generates a delivery plan of delivery device 130 for an item of a delivery request. For example, delivery program 200 uses a machine learning model (discussed in step 212) with variables covering various component parts, sub-assembly components, component parts that may be 3D printed in transit, autonomous vehicles that can be coupled for assembly, interface/components that are part of coupling sub-assemblies, and/or time to assemble the final product to identify optimization options (e.g., possible common delivery routes, staging areas, etc.) and generate a final delivery plan. In this example, delivery program 200 can include in the final delivery plan a delivery path, staging areas, common delivery routes, and/or path optimizations so that one or more autonomous vehicles traveling along a delivery path to delivery destination in accordance with the final delivery plan can assemble one or more final products while in transit. Additionally, delivery plan can determine an appropriate quantity of individual component parts to load in the one or more autonomous vehicles so that the one or more autonomous vehicles can use every component part required in preparing various final products while receiving a supply of individual components from a warehouse of a supplier location when traveling towards the delivery destination or returning towards the warehouse.

Referring to FIG. 3, in an example embodiment, delivery program 200 utilizes one or more instances of delivery device 130 to transport component parts 316 from a location of one or more instances of client device 130 to assemble final product 320 or unfinished product 318. In this example, delivery program 200 uses one or more autonomous vehicles to retrieve one or more instances of component parts 316 from various locations. Additionally, the one or more instances of delivery device 130 utilizes communications module 136 to transmit context aware communications to couple to one another and transfer and/or exchange one or more instances of component parts 316 for assembling final product 320 or unfinished product 318 according to respective bills of materials while traveling along common paths identified by delivery program 200.

In decision step 216, delivery program 200 determines whether the item is assembled. In one embodiment, delivery program 200 utilizes data of one or more instances of delivery device 130 to determine whether an item of a delivery request is assembled. For example, delivery program 200 determines whether an autonomous vehicle (e.g., delivery device 130) includes pending assembly steps of an assembly sequence of a final product according to a corresponding bill of material. In this example, delivery program 200 queries one or more autonomous vehicles assigned to assemble the final product to determine a status corresponding to a step of the assembly sequence of the final product that the one or more autonomous vehicles are currently performing.

Referring to FIG. 3, in an example embodiment, delivery program 200 utilizes delivery device 130 and component parts 316 to assemble one or more final products. In this example, delivery program 200 utilizes assembly arm 314 and component parts 316 to construct final product 314 and unfinished product 318 in assembly chamber 312. Furthermore, delivery device 130 can include a temporary storage portion of assembly chamber 312 of received component parts 316 from another autonomous vehicle and use the received component parts 316 in assembling according to an assembly sequence of a corresponding delivery request. Additionally, component parts 316 can be a spring used for creating clock or a spring can also be used for creating a toy robot.

In another embodiment, if delivery program 200 determines that an item of a delivery request is not assembled (decision step 216, "NO" branch), then delivery program 200 continues to monitor assembly of the item of the delivery request. For example, delivery program 200 queries one or more autonomous vehicles (e.g., delivery device 130) assigned to assemble the final product and determines that the one or more autonomous vehicles returned a status that includes identification of a step of an assembly sequence the one or more autonomous vehicles are currently performing then delivery program 200 continues to manage the one or more autonomous vehicles coupling to one another to receive component parts and performing assembly of the final product.

In another embodiment, if delivery program 200 determines that an item of a delivery request is assembled (decision step 216, "YES" branch), then delivery program 200 continues manage transport of the item to a delivery destination. For example, delivery program 200 queries one or more autonomous vehicles (e.g., delivery device 130)

assigned to assemble the final product and determines that the one or more autonomous vehicles returned a status that indicates that all steps of an assembly sequence of the final product are complete, then delivery program 200 continues to utilize an autonomous vehicle of the one or more vehicles to transport the final product along a delivery path of a final delivery plan to an address (e.g., geolocation, delivery destination, etc.) of a user.

In decision step 218, delivery program 200 determines whether the item is present at a delivery destination. In various embodiments of the present invention, once the final product is assembled, delivery device 130 can deliver the final product to a customer. In one embodiment, delivery program 200 utilizes data of one or more instances of delivery device 130 to determine whether an item of a delivery request is present at a delivery destination of a user. For example, delivery program 200 determines whether an autonomous vehicle (e.g., delivery device 130) that includes an assembled final product is present at a geolocation corresponding to an address of the of a delivery request. In this example, delivery program 200 queries the autonomous vehicle assigned to deliver the assembled final product for a current geolocation (e.g., GPS module 132) to determine whether the autonomous vehicle is proximate (e.g., matching GPS coordinates) to the address of the delivery request.

In another embodiment, if delivery program 200 determines that an item of a delivery request is not present at a delivery destination of a user (decision step 218, "NO" branch), then delivery program 200 continues to monitor GPS module 132 of delivery device 130. For example, delivery program 200 queries an autonomous vehicle assigned to deliver an assembled final product for a current geolocation (e.g., GPS module 132) to determine that the autonomous vehicle is not proximate (e.g., GPS coordinates do not match) to an address of a delivery request and delivery program 200 continues to monitor the geolocation of the autonomous vehicle with respect to the address of the delivery request.

In another embodiment, if delivery program 200 determines that an item of a delivery request is present at a delivery destination of a user (decision step 218, "YES" branch), then delivery program 200 instructs delivery device 130 to deposit the item. For example, delivery program 200 queries an autonomous vehicle assigned to deliver an assembled final product for a current geolocation (e.g., GPS module 132) to determine that the autonomous vehicle is proximate (e.g., GPS coordinates match) to an address of a delivery request and delivery program 200 releases the assembled final product to a user.

In step 220, delivery program 200 deposits the item at the delivery destination. In one embodiment, delivery program 200 releases an item of a delivery request at a delivery destination. For example, delivery program 200 instructs an autonomous vehicle (e.g., delivery device 130) to open a storage chamber of the autonomous vehicle to release an assembled final product. In another example, delivery program 200 utilizes an assembly arm of an autonomous vehicle to remove an assembled final product from a storage chamber of the autonomous vehicle. In yet another example, delivery program 200 releases an assembled final product of an autonomous vehicle to a user in response to detecting a GPS beacon associated with the user of the delivery request.

Figure 4:
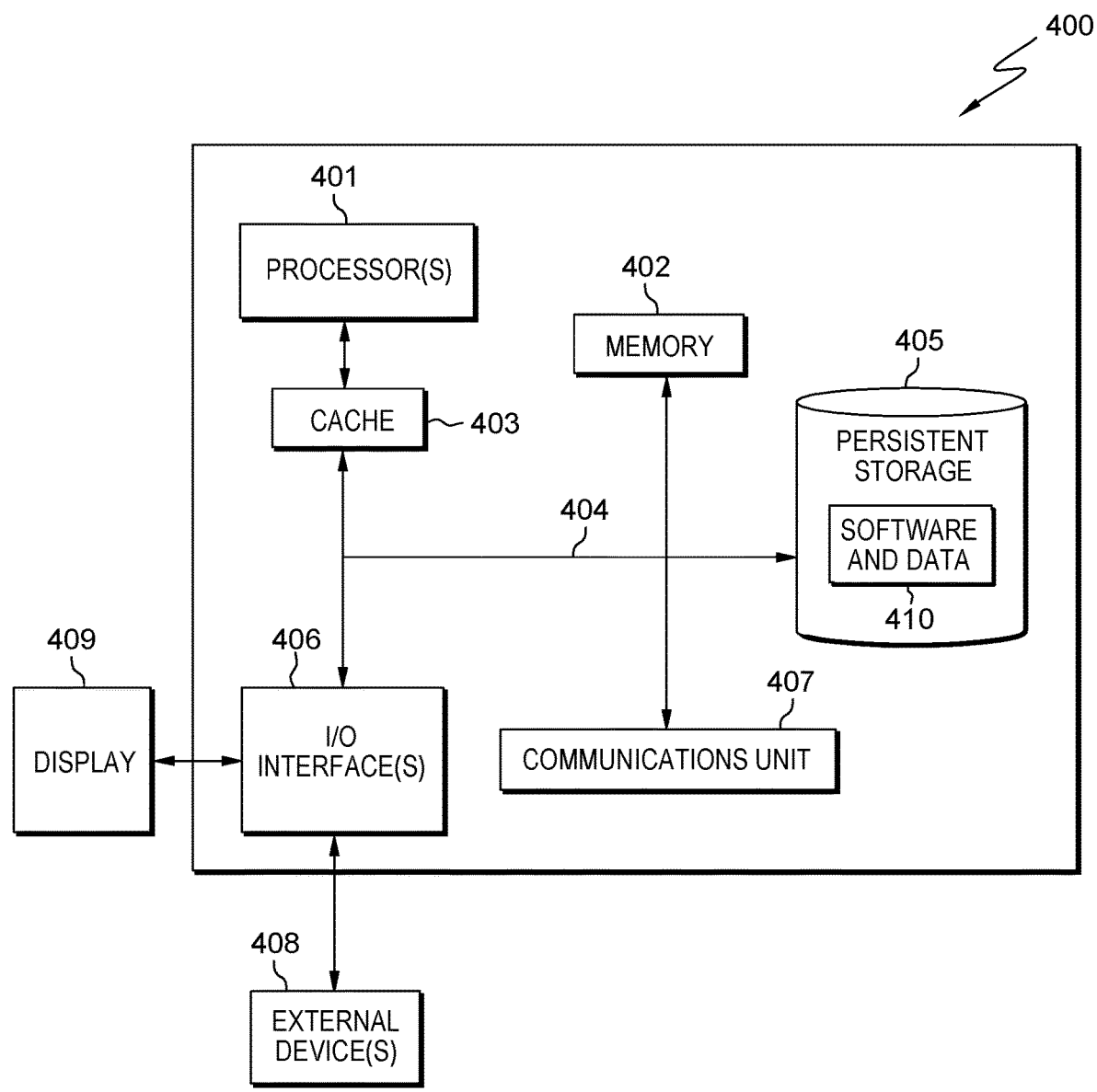
FIG. 4 is a block diagram of components of FIG. 1, in accordance with an embodiment of the present invention.

FIG. 4 depicts a block diagram of components of client device 120, delivery device 130, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to delivery device 130, software and data 410 includes data of GPS module 132, sensor 134, communication module 136, and controller 138. With respect to server 140, software and data 410 includes data of storage device 142, database 144, and delivery program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more processors, a delivery request from a user for a product;
    identifying, by one or more processors, one or more suppliers of component parts of the product;
    determining, by one or more processors, common delivery routes of the component parts of the product, wherein the common delivery routes includes respective routes from locations of the one or more suppliers to a delivery destination of the delivery request;
    determining, by one or more processors, a delivery path to the delivery destination of the product based at least in part on the common delivery routes;
    generating, by one or more processors, a final delivery plan corresponding to the product for one or more autonomous vehicles based at least in part on the delivery path and the one or more suppliers of the component parts;
    identifying, by one or more processors, using natural language processing (NLP), an assembly sequence of the product from a corresponding bill of material of the delivery request;
    determining, by one or more processors, one or more assembly steps of the assembly sequence to perform concurrently by two or more autonomous vehicles;
    transmitting, by one or more processors, context aware communications between the two or more autonomous vehicles, wherein the context aware communications include a relative location of a first autonomous vehicle of the one or more autonomous vehicles, the assembly sequence, and the bill of material;
    coupling, by one or more processors, the two or more autonomous vehicles based at least in part on the context aware communications; and
    assembling, by one or more processors, the product according to the assembly sequence utilizing respective component parts of each of the two or more autonomous vehicles.

2. The method of claim 1, further comprising:
    identifying, by one or more processors, the bill of material of the product; and
    extracting, by one or more processors, textual data from the bill of material of the product, wherein the textual data includes information corresponding to the delivery destination, supplier locations of the component parts, and identifiers of the one or more autonomous vehicles that will transmit the component parts.

3. The method of claim 1, further comprising:
    directing, by one or more processors, a plurality of autonomous vehicles to traverse a delivery path of the generated final delivery plan to the delivery destination, wherein the plurality of autonomous vehicles includes the two or more autonomous vehicles assembling the product.

4. The method of claim 1, wherein determining the delivery path to the delivery destination of the product based at least in part on the common delivery routes, further comprises:
    identifying, by one or more processors, a route from a first supplier of the one or more suppliers of component parts to the delivery path to the delivery destination of the product;
    inputting, by one or more processors, a geolocation of the one or more suppliers of the component parts of the delivery request and the delivery destination of the product into a machine learning model; and
    in response to receiving an output corresponding to the input of the machine learning model, identifying, by one or more processors, one or more common delivery routes of a plurality of respective routes within a predetermined threshold distance to the delivery path.

5. The method of claim 4, further comprising:
    determining, by one or more processors, weather conditions of the one or more common delivery routes based at least in part on sensor data of one or more autonomous vehicles travelling along the one or more common delivery routes; and
    modifying, by one or more processors, the delivery path to the delivery destination based at least in part on the weather conditions and the one or more common delivery routes.

6. A non-transitory computer program product comprising:
    one or more non-transitory computer readable storage media and program instructions stored on the one or more non-transitory computer readable storage media, the program instructions comprising: program instructions to identify a delivery request from a user for a product;
    program instructions to identify one or more suppliers of component parts of the product;
    program instructions to determine common delivery routes of the component parts of the product, wherein the common delivery routes include respective routes from locations of the one or more suppliers to a delivery destination of the delivery request;
    program instructions to determine a delivery path to the delivery destination of the product based at least in part on the common delivery routes;
    program instructions to generate a final delivery plan corresponding to the product for one or more autonomous vehicles based at least in part on the delivery path and the one or more suppliers of the component parts;
    identify using natural language processing (NLP), an assembly sequence of the product from a corresponding bill of material of the delivery request;

determine one or more assembly steps of the assembly sequence to perform concurrently by two or more autonomous vehicles;

transmit context aware communications between the two or more autonomous vehicles, wherein the context aware communications include a relative location of a first autonomous vehicle of the one or more autonomous vehicles, the assembly sequence, and the bill of material;

couple the two or more autonomous vehicles based at least in part on the context aware communications; and assemble the product according to the assembly sequence utilizing respective component parts of each of the two or more autonomous vehicles.

7. The non-transitory computer program product of claim 6, further comprising program instructions, stored on the one or more non-transitory computer readable storage media, to:

identify the bill of material of the product; and extract textual data from the bill of material of the product, wherein the textual data includes information corresponding to the delivery destination, supplier locations of the component parts, and identifiers of the one or more autonomous vehicles that will transmit the component parts.

8. The non-transitory computer program product of claim 6, further comprising program instructions, stored on the one or more non-transitory computer readable storage media, to:

direct a plurality of autonomous vehicles to traverse a delivery path of the generated final delivery plan to the delivery destination, wherein the plurality of autonomous vehicles includes the two or more autonomous vehicles assembling the product.

9. The non-transitory computer program product of claim 6, wherein program instructions to determine the delivery path to the delivery destination of the product based at least in part on the common delivery routes, further comprise program instructions to:

identify a route from a first supplier of the one or more suppliers of component parts to the delivery path to the delivery destination of the product;

input a geolocation of the one or more suppliers of the component parts of the delivery request and the delivery destination of the product into a machine learning model; and in response to receiving an output corresponding to the input of the machine learning model, identify one or more common delivery routes of a plurality of respective routes within a predetermined threshold distance to the delivery path.

10. The non-transitory computer program product of claim 9, further comprising program instructions, stored on the one or more non-transitory computer readable storage media, to:

determine weather conditions of the one or more common delivery routes based at least in part on sensor data of one or more autonomous vehicles travelling along the one or more common delivery routes; and modify the delivery path to the delivery destination based at least in part on the weather conditions and the one or more common delivery routes.

11. A computer system comprising:

one or more computer processors;

one or more computer readable storage media; and program instructions stored on the computer readable storage media for execution by at least one of the one or more processors, the program instructions comprising:

program instructions to identify a delivery request from a user for a product;

program instructions to identify one or more suppliers of component parts of the product;

program instructions to determine common delivery routes of the component parts of the product, wherein the common delivery routes include respective routes from locations of the one or more suppliers to a delivery destination of the delivery request;

program instructions to determine a delivery path to the delivery destination of the product based at least in part on the common delivery routes;

program instructions to generate a final delivery plan corresponding to the product for one or more autonomous vehicles based at least in part on the delivery path and the one or more suppliers of the component parts;

identify using natural language processing (NLP), an assembly sequence of the product from a corresponding bill of material of the delivery request;

determine one or more assembly steps of the assembly sequence to perform concurrently by two or more autonomous vehicles;

transmit context aware communications between the two or more autonomous vehicles, wherein the context aware communications include a relative location of a first autonomous vehicle of the one or more autonomous vehicles, the assembly sequence, and the bill of material;

couple the two or more autonomous vehicles based at least in part on the context aware communications; and assemble the product according to the assembly sequence utilizing respective component parts of each of the two or more autonomous vehicles.

12. The computer system of claim 11, further comprising program instructions, stored on the one or more computer readable storage media for execution by at least one of the one or more processors, to:

identify the bill of material of the product; and extract textual data from the bill of material of the product, wherein the textual data includes information corresponding to the delivery destination, supplier locations of the component parts, and identifiers of the one or more autonomous vehicles that will transmit the component parts.

13. The computer system of claim 11, further comprising program instructions, stored on the one or more computer readable storage media for execution by at least one of the one or more processors, to:

direct a plurality of autonomous vehicles to traverse a delivery path of the generated final delivery plan to the delivery destination, wherein the plurality of autonomous vehicles includes the two or more autonomous vehicles assembling the product.

14. The computer system of claim 11 determine the delivery path to the delivery destination of the product based at least in part on the common delivery routes, further comprise program instructions to:

identify a route from a first supplier of the one or more suppliers of component parts to the delivery path to the delivery destination of the product;

input a geolocation of the one or more suppliers of the component parts of the delivery request and the delivery destination of the product into a machine learning model; and in response to receiving an output corresponding to the input of the machine learning model, identify one or more common delivery routes of a plurality of respective routes within a predetermined threshold distance to the delivery path.

\* \* \* \* \*